(12) United States Patent
Chou

(10) Patent No.: US 11,840,037 B2
(45) Date of Patent: Dec. 12, 2023

(54) FLUID-IMPERVIOUS SLIDE FASTENER, MANUFACTURING METHOD THEREOF AND PRODUCT HAVING SAME

(71) Applicants: Chao-Mu Chou, Taipei (TW); Shiu-Yin Cheng, Taoyuan (TW)

(72) Inventor: Chao-Mu Chou, Taipei (TW)

(73) Assignees: Chao-Mu Chou, Taipei (TW); Shiu-Yin Cheng, Taoyuan (TW)

( * ) Notice: Subject to any disclaimer, the term of this patent is extended or adjusted under 35 U.S.C. 154(b) by 28 days.

(21) Appl. No.: 17/974,989

(22) Filed: Oct. 27, 2022

(65) Prior Publication Data

US 2023/0050308 A1 Feb. 16, 2023

Related U.S. Application Data

(62) Division of application No. 17/016,597, filed on Sep. 10, 2020, now Pat. No. 11,529,778.

(51) Int. Cl.
| | |
|---|---|
| *B29K 21/00* | (2006.01) |
| *B29D 5/02* | (2006.01) |
| *B29D 5/10* | (2006.01) |
| *A44B 19/06* | (2006.01) |
| *A44B 19/52* | (2006.01) |
| *A44B 19/32* | (2006.01) |

(52) U.S. Cl.
CPC ............... *B29D 5/02* (2013.01); *A44B 19/06* (2013.01); *A44B 19/32* (2013.01); *A44B 19/52* (2013.01); *B29D 5/10* (2013.01); *B29K 2021/003* (2013.01); *Y10T 24/2514* (2015.01)

(58) Field of Classification Search
CPC ......... A44B 19/00; A44B 19/06; A44B 19/12; A44B 19/32; A44B 19/52; B29D 5/02; B29D 5/10; B29D 5/06; Y10T 24/2514
See application file for complete search history.

(56) References Cited

U.S. PATENT DOCUMENTS

| | | | |
|---|---|---|---|
| 4,888,859 A | 12/1989 | Horita | |
| 6,105,214 A | 8/2000 | Press | |
| 6,427,294 B1 | 8/2002 | Shibaike | |
| 8,484,810 B2 | 7/2013 | Chou | |
| 8,689,408 B2 | 4/2014 | Chou | |
| 2002/0017010 A1* | 2/2002 | Neugebauer | A44B 19/32 24/391 |
| 2010/0125982 A1* | 5/2010 | Chou | A44B 19/32 24/397 |

(Continued)

FOREIGN PATENT DOCUMENTS

CN 109330117 2/2019

*Primary Examiner* — Robert Sandy
*Assistant Examiner* — Michael S Lee
(74) *Attorney, Agent, or Firm* — GUICE PATENTS PLLC

(57) ABSTRACT

A fluid-impervious slide fastener is disposed; an covering abutting member is formed in a central slit of a pair of support tapes, the covering abutting member has a first covering body having a covering layer and a second covering body having a covering layer; when the fluid-impervious slide fastener is in a coupled status, the first covering body and the second covering body are able to elastically abut against each other so as to form a tightening deformation, thus the central slit is provided with a fluid-impervious function against a fluid, for example a liquid, of capable of bearing a hydrostatic pressure of 30 gf/cm$^2$.

11 Claims, 7 Drawing Sheets

(56) References Cited

U.S. PATENT DOCUMENTS

2010/0281657 A1* 11/2010 Ujihara .................. A44B 19/34
24/435
2018/0360172 A1* 12/2018 Chou ..................... A44B 19/32
2020/0221831 A1* 7/2020 Zhang .................... A44B 19/32

* cited by examiner

FLUID-IMPERVIOUS SLIDE FASTENER, MANUFACTURING METHOD THEREOF AND PRODUCT HAVING SAME

BACKGROUND OF THE INVENTION

1. Field of the Invention

The present invention relates to a slide fastener, especially to a fluid-impervious slide fastener having a fluid-impervious function. Moreover, the present invention relates to a manufacturing method of a fluid-impervious slide fastener and a product having the fluid-impervious slide fastener.

2. Description of Related Art

Slide fasteners are commonly seen in daily life and often deemed as necessary coupling devices; due to the property of easily being closed or opened, a slide fastener is adopted in various applications, such as being adopted in garments, for example clothes or pants, a portable item, for example a purse or a backpack, or a camping tool, for example a tent or a sleep bag.

As a matter of fact, for providing waterproof and windproof functions to the above-mentioned products, the material adopted as an outer layer of a snowsuit, for a purpose of being waterproof, is selected from a Nylon material or a water-repelling treatment, or a waterproof lining is provided therein for obtaining a waterproof function.

The slide fastener used as the opened or closed device has become a disadvantage for the purpose of waterproof, even though a pair of support tapes of the slide fastener have a waterproof layer, a fluid is unable to permeate from the pair of support tapes, but a combination of each of the support tapes and a plurality of coupling elements arranged in a row manner is achieved via a non-rigid means for example sewing or weaving, and a central slit is formed between the pair of support tapes, the central slit is inevitably stretched due to an external transversal pulling force when in use, therefore water may still permeate; as such, the installation of the waterproof layer requires a water-repelling treatment on another surface (in other words a surface opposite to the waterproof surface) of the pair of support tapes, thus a water-repelling function is provided, for example U.S. Pat. No.4,888,859, U.S. Pat. No.6,105,214 and U.S. Pat. No.6,427,294 have disclosed that the central slit is the most difficult problem to be improved in the conventional waterproof slide fastener.

In view of the above-mentioned disadvantages of the waterproof slide fastener, the skilled people in the art have improved the whole structure of the slide fastener for being provided with a function of preventing a fluid from permeating; especially preventing a fluid from permeating from the central slit is a first goal to be achieved.

U.S. Pat. No.8,484,810 and U.S. Pat. No.8,689,408 granted to the applicant of the present invention have disposed a high polymer elastomer extending member filled in the central slit, the high polymer elastomer extending member adheres an inner side edge of each of the support tapes and fills in gaps of the coupling members, thereby forming a firm continuous member, a fluid can be prevented from permeating from the central slit through the high polymer elastomer extending member, and functions being firm and non-displacing are provided and an effect of fluid-impervious in a long term is achieved.

The high polymer elastomer extending member is able to block most of the space of the central slit having a width of 1.50 mm to 2.50 mm, but after the high polymer elastomer extending member is cut, a cutting slit having a width of 0.05 mm to 0.10 mm is formed, and the cutting slit is unable to block water molecules from permeating (because a diameter of water molecule is under 1 nm); as such, a fluid, for example water, can still slowly permeate from the cutting slit of the high polymer elastomer extending member. Wherein, U.S. Pat. No.8,484,810 has also disclosed a fluid-impervious film protruding from the high polymer elastomer extending member, but the protruding fluid-impervious film can only shield the cutting slit, and cannot block water molecules from permeating from the cutting slit.

China Patent No. CN109330117 has disclosed a waterproof slide fastener, wherein a bending part of each of two waterproof layers is able to mutually press for jointly sealing a slit (a.k.a. the above-mentioned central slit) between two slide fastener tapes. Because the slit is shallow and wide; an effective depth of the slit is actually equal to a thickness of the slide fastener tape, which is about 0.35 nm to without any component used for stabilizing the two slide fastener tapes, the slit between the two slide fastener tapes would be easily displaced and stretched via an external force, for example being displaced 1.80 mm or grater, especially inner side edges of the two slide fastener tapes, wherein each of the inner side edges is defined as a portion from the inner side edge of each of the slide fastener tapes to a sewing line, the inner side edge and the bending part are both freely moveable, thus the bending part is difficult to be stably disposed in the slit which is shallow and wide, and the pair of soft slide fastener tapes are not provided with a rigidity capable of clamping and tightening the bending part, the soft structure would cause the bending part to be easily released from the slit between the two slide fastener tapes, thereby unable to seal the slit, and an anticipated waterproof function cannot be achieved.

Moreover, the aforesaid patents have also disclosed a filling block disposed between adjacent chain teeth of each of the slide fastener tapes, and the filling block is formed through a waterproof layer being downwardly extended. As shown in FIG. 1 and FIG. 2 of the aforesaid patent, a gap is formed between the filling block below the waterproof layer and each of the slide fastener tapes, the above-mentioned arrangement has the same disadvantages as the above-mentioned embodiment, because the filling block is not connected to the inner side edge of each of the slide fastener tapes, the rigidity of the slide fastener tape is unable to be increased, and the mobility of each of the inner side edges cannot be fixed, thus the pair of slide fastener tapes are unable to generate a sufficient horizontal rigid supporting force to push and clamp the bending part of the waterproof layer, so that an effect of being capable of mutually pressing for jointly sealing the slit between the two slide fastener tapes cannot be achieved.

SUMMARY OF THE INVENTION

One primary objective of the present invention is to provide a fluid-impervious slide fastener, wherein a covering abutting member is disposed in a central slit of a pair of support tapes, the covering abutting member has a first covering member and a second covering member; when the fluid-impervious slide fastener in a coupled status, the first covering member and the second covering member are able to elastically abut against each other so as to form a tightening deformation, and the covering abutting member is formed in the central slit and has a fluid-impervious function against a fluid, for example bearing a hydrostatic pressure of at least 30 gf/cm².

For achieving said objective, one technical solution provided by the present invention is to provide a fluid-impervious slide fastener, which includes a pair of support tapes each having a top surface, a bottom surface and an inner side edge, wherein a bottom inner edge of each of the bottom surfaces is disposed with a plurality of continuous coupling elements arranged in a row manner, a gap filling member composed of a high polymer elastomer member is disposed in a plurality of adjacent gaps of the plurality of continuous coupling elements, the gap filling member is longitudinally extended and adhered to the corresponding bottom inner edge and the corresponding inner side edge, and a slit covering member is transversally formed above the plurality of continuous coupling elements; the slit covering member has a left covering member having a left cutting end surface and a right covering member having a right cutting end surface, and a central slit has a width after the slider fastener is coupled; the top surface of the support tape at a left side and the left covering member are transversally adhered with a waterproof layer, the top surface of the support tape at a right side and the right covering member are transversally adhered with another waterproof layer, and a covering layer extended from each of the waterproof layers is able to longitudinally cover at least one portion of the left cutting end surface and at least one portion of the right cutting end surface, so that a first covering body having a first length is jointly defined by the left covering member and the covering layer, and a second covering body having a second length is jointly defined by the right covering member and the covering layer; when the plurality of continuous coupling elements are in a coupled status, a sum of the first length and the second length is greater than the width of the central slit, so that the first covering body and the second covering body are able to elastically abut against each other so as to form a tightening deformation, and a covering abutting member having a fluid-impervious function to a fluid is formed in the central slit.

According to one embodiment of the present invention, the covering abutting member in the central slit has a fluid-impervious function capable of bearing a hydrostatic pressure of at least 30 gf/cm².

According to one embodiment of the present invention, each of the covering layers covers the left cutting end surface and the right cutting end surface with an adhering means.

According to one embodiment of the present invention, a length of the covering layer is greater than a height of the left cutting end surface and a height of the right cutting end surface, and the covering layer has a margin to form a folded part higher than the top surface.

According to one embodiment of the present invention, the waterproof layer is adhered to the pair of support tapes, the left covering member and the right covering member by utilizing a hot melt glue, a solvent glue, a water-based glue or a moisture curing polyurethane (PUR), and the waterproof layer is selected from a group consisted of transparent and/or opaque ethers-polyurethane, esters-polyurethane, silicone, polyurethane/silicone copolymer, polyamide, polyolefin, polyvinyl chloride and fluid-impervious woven fabrics.

According to one embodiment of the present invention, a dimensional difference of the sum of the first length and the second length being greater than the width of the central slit is preferably between 0.10 mm to 1.30 mm.

According to one embodiment of the present invention, a thickness of the waterproof layer and a thickness of the covering layer are 0.05 mm to 0.70 mm.

According to one embodiment of the present invention, the high polymer elastomer member is disposed in the central slit and arranged to be higher than or aligned with each of the top surfaces of the pair of support tapes.

According to one embodiment of the present invention, the high polymer elastomer member overflows the central slit so as to adhere to at least one portion defined on each of the top surfaces of the pair of support tapes.

According to one embodiment of the present invention, the continuous coupling elements are respectively disposed in each of the bottom inner edges of the pair of support tapes or a folded part of each of the top surfaces.

According to one embodiment of the present invention, a high polymer elastomer member is further provided to cover the continuous coupling elements oppositely arranged at a left side and a right side, a combining yarn and at least one portion of each of the bottom surfaces of the pair of support tapes, thereby forming a coupling element covering body, and the coupling element covering body and the gap filling member are combined as one piece.

Another objective of the present invention is to provide a manufacturing method of a fluid-impervious slide fastener, which has a fluid-impervious function against a fluid, for example capable of bearing a hydrostatic pressure of at least 30 gf/cm² in a liquid.

For achieving said objective, one technical solution provided by the present invention is to provide a manufacturing method of a fluid-impervious slide fastener, which includes steps: preparing a pair of support tapes, wherein each of the support tapes has a top surface, a bottom surface and an inner side edge, and a bottom inner edge of each of the bottom surfaces is disposed with a plurality of continuous coupling elements arranged in a row manner; processing an extruding procedure of a high polymer elastomer member to a central slit between the pair of support tapes while the pair of support tapes being in a coupled status, thereby allowing a gap filling member to be formed in a plurality of adjacent gaps of the continuous coupling elements, wherein the gap filling member is longitudinally extended and adhered to the corresponding bottom inner edge and the corresponding inner side edge of the pair of support tapes, and a slit covering member is transversally formed on the plurality of continuous coupling elements; processing a cutting procedure to the slit covering members in the central slit for allowing the slit covering member to be formed as a left covering member and a right covering member, and the central slit has a width after the continuous coupling elements are coupled; the left covering member has a left cutting end surface, and the right covering member has a right cutting end surface; disposing a waterproof layer on the top surface of the support tape at a left side and the left covering member, and disposing another waterproof layer on the top surface of the support tape at a right side and the right covering member, wherein a covering layer is extended from a lateral side of each of the waterproof layers to longitudinally cover at least one portion of the left cutting end surface and at least one portion of the right cutting end surface, and a first covering body having a first length is jointly defined by the left covering member and the covering layer, and a second covering body having a second length is jointly defined by the right covering member and the covering layer; when the plurality of continuous coupling elements are in a coupled status, a sum of the first length and the second length is greater than the width of the central slit, so that the first covering body and the second covering body are able to elastically abut against each other so as to form a tightening deformation, and a covering abutting member having a fluid-impervious function against a fluid is formed in the central slit.

According to one embodiment of the present invention, the covering abutting member in the central slit has a fluid-impervious function of bearing a hydrostatic pressure of at least 30 gf/cm$^2$.

According to one embodiment of the present invention, each of the covering layers covers the left cutting end surface and the right cutting end surface with an adhering means.

According to one embodiment of the present invention, a length of the covering layer is greater than a height of the left cutting end surface and a height of the right cutting end surface, and the covering layer has a margin to form a folded part higher than the top surface.

According to one embodiment of the present invention, the waterproof layer is adhered to the pair of support tapes, the left covering member and the right covering member by utilizing a hot melt glue, a solvent glue, a water-based glue or a moisture curing polyurethane (PUR), and the waterproof layer is selected from a group consisted of transparent and/or opaque ethers-polyurethane, esters-polyurethane, silicone, polyurethane/silicone copolymer, polyamide, polyolefin, polyvinyl chloride and fluid-impervious woven fabrics.

According to one embodiment of the present invention, a dimensional difference of the sum of the first length and the second length being greater than the width of the central slit is preferably between 0.10 mm to 1.30 mm.

According to one embodiment of the present invention, a thickness of the waterproof layer and a thickness of the covering layer are 0.05 mm to 0.70 mm.

According to one embodiment of the present invention, the high polymer elastomer member is disposed in the central slit and arranged to be higher than or aligned with each of the top surfaces of the pair of support tapes.

According to one embodiment of the present invention, the high polymer elastomer member overflows the central slit so as to adhere to at least one portion defined on each of the top surfaces of the pair of support tapes.

According to one embodiment of the present invention, the continuous coupling elements are respectively disposed in each of the bottom inner edges of the pair of support tapes or a folded part of each of the top surfaces.

According to one embodiment of the present invention, a high polymer elastomer member is further provided to cover the continuous coupling elements oppositely arranged at a left side and a right side, a combining yarn and at least one portion of each of the bottom surfaces of the pair of support tapes, thereby forming a coupling element covering body, and the coupling element covering body and the gap filling member are combined as one piece.

One another objective of the present invention is to provide a product, the product is a garment or a portable item or a camping tool, and a coupling device adopted in the product is a fluid-impervious slide fastener.

For achieving said objective, one technical solution provided by the present invention is to provide a product used a garment or a portable item or a camping tool, and a coupling device adopted in the product is a fluid-impervious slide fastener.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
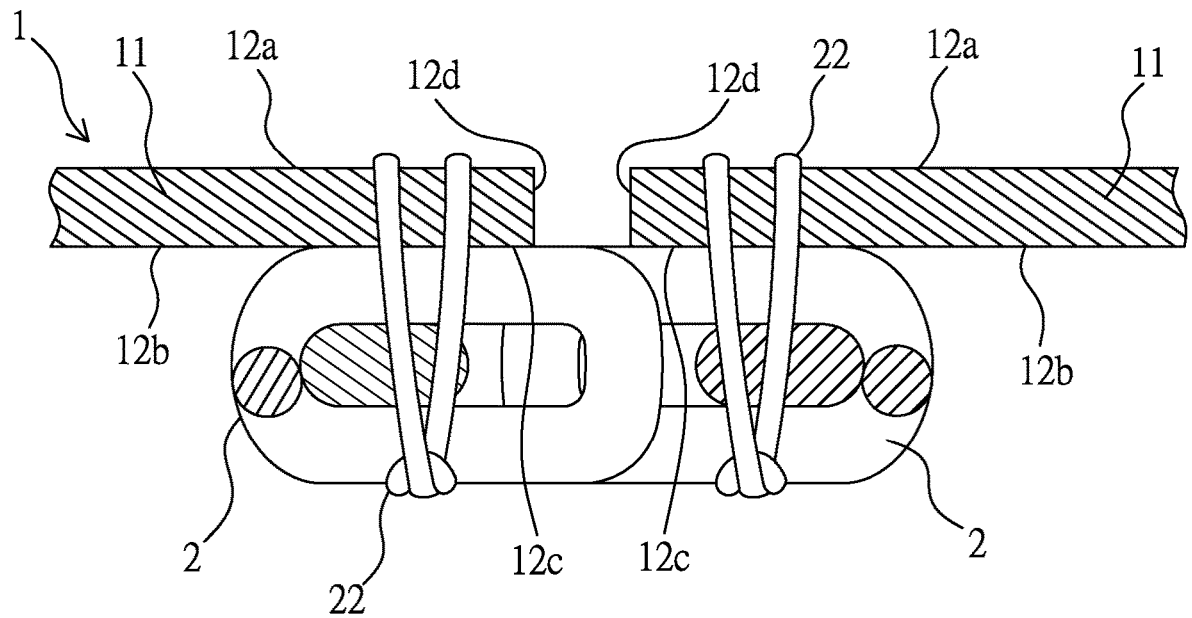
FIG. 1 to FIG. 6 are cross sectional views illustrating a manufacturing procedure of a fluid-impervious slide fastener according to a first embodiment of the present invention.

Please refer from FIG. 1 to FIG. 6, which disclose a manufacturing procedure of a fluid-impervious slide fastener according to a first embodiment of the present invention. As shown in FIG. 1, according to this embodiment, a continuous-coil type coupling element sewing slide fastener 1 having cords is adopted, the slide fastener 1 has a pair of support tapes 11, the pair of support tapes 11 respectively have a top surface 12a, a bottom surface 12b, a bottom inner edge 12c and an inner side edge 12d, and an inner side of each of the bottom surfaces 12b has a plurality of continuous coupling elements 2 arranged in a row manner, and the bottom inner edge 12c is defined as a moveable portion between the inner side edge 12d and a combining yarn 22. The plurality of continuous coupling elements 2 and the pair of support tapes 11 are combined via the combining yarn 22 (sewing thread or warp/weft yarn).

Figure 2:
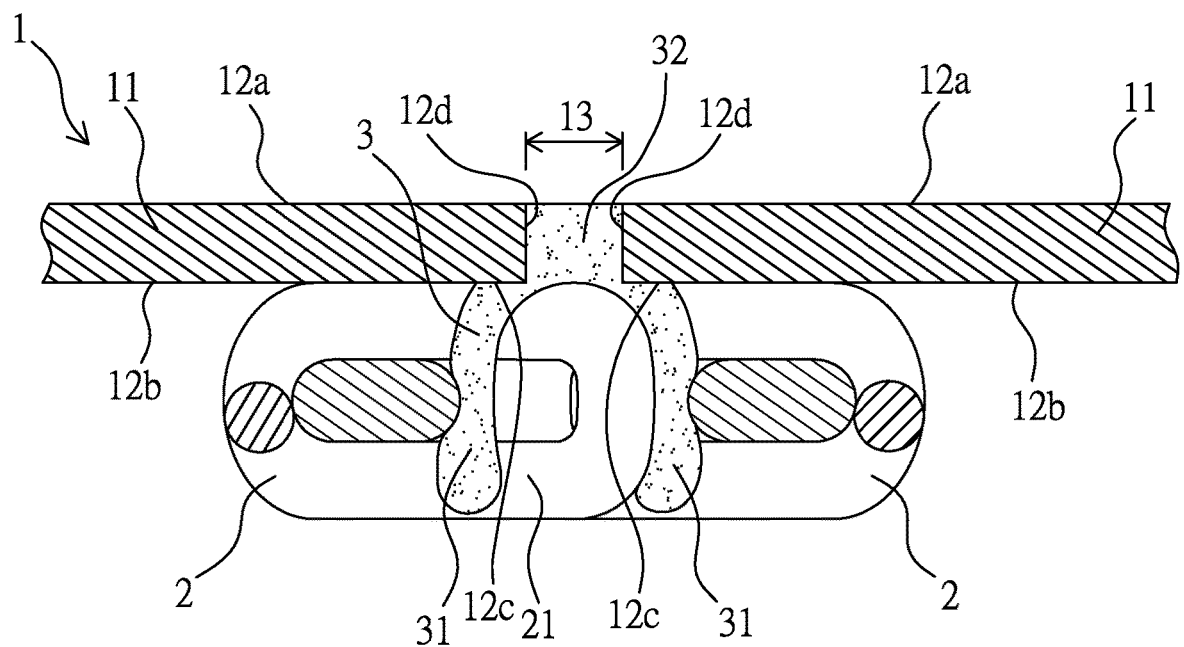

As shown in FIG. 2, when the slide fastener 1 is in a coupled status, an extruding mold (known as a prior art and not provided with a code) is disposed in a central slit 13 of the pair of support tapes 11, then an extruding procedure is processed, for example a molten high polymer elastomer member 3 being filled and fully disposed in a plurality of gaps 21 between the adjacent continuous coupling elements 2 through a high polymer elastomer filling port of the extruding mold, thereby forming a gap filling member 31, and a slit covering member 32 is formed in the central slit 13 which is located above the plurality of continuous coupling elements 2, and the high polymer elastomer member also adheres to each of the inner side edges 12d and each of the bottom inner edges 12c.

Figure 3:
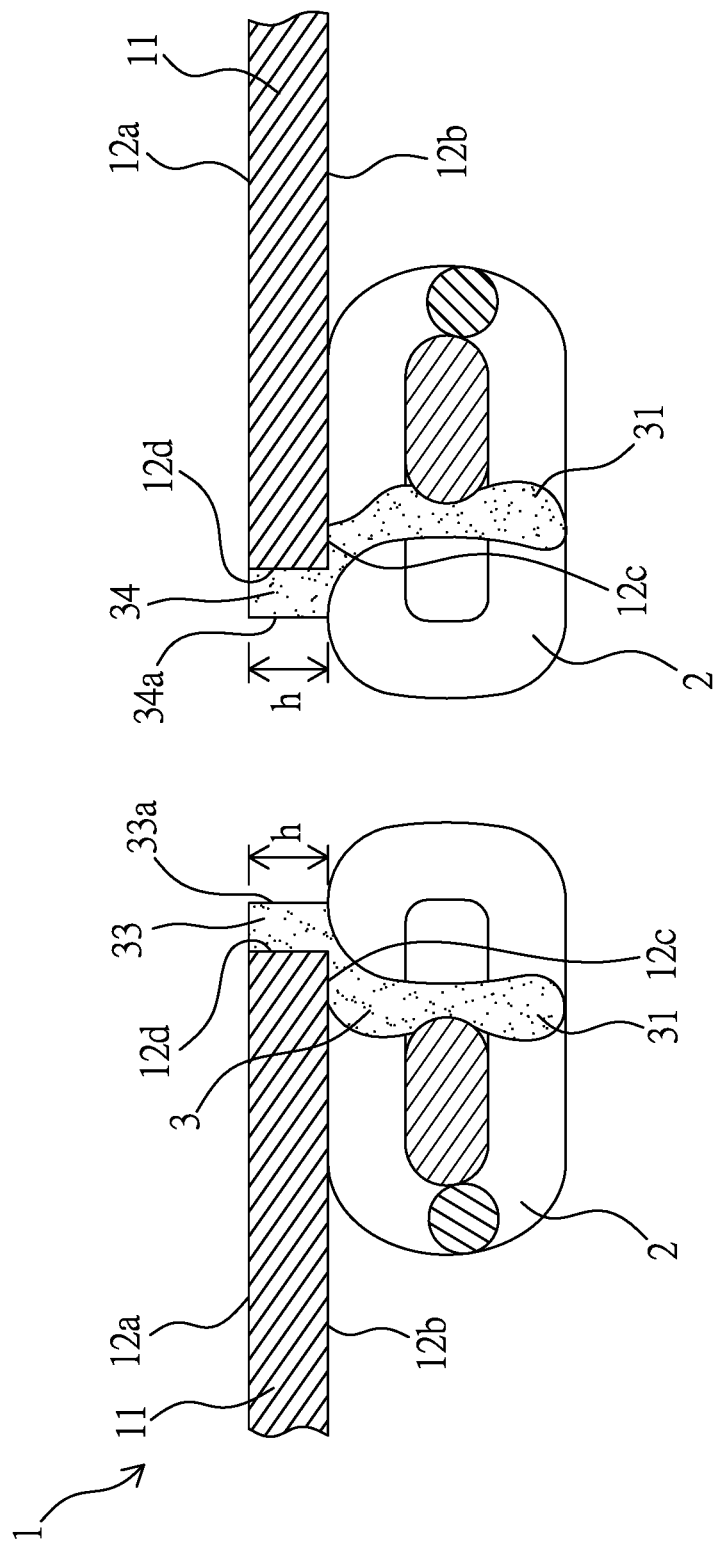

As show in FIG. 3, a cutting procedure is processed to the slit covering members 32 located in the central slit 13 of the slide fastener 1 along a substantially central line of the central slit 13, so that the slit covering member 32 is formed as a left covering member 33 and a right covering member 34 having a substantially same length, the left covering member 33 has a left cutting end surface 33a, the right covering member 34 has a right cutting end surface 34a, and the left cutting end surface 33a and the right cutting end surface 34a have a height h, respectively.

Figure 4:
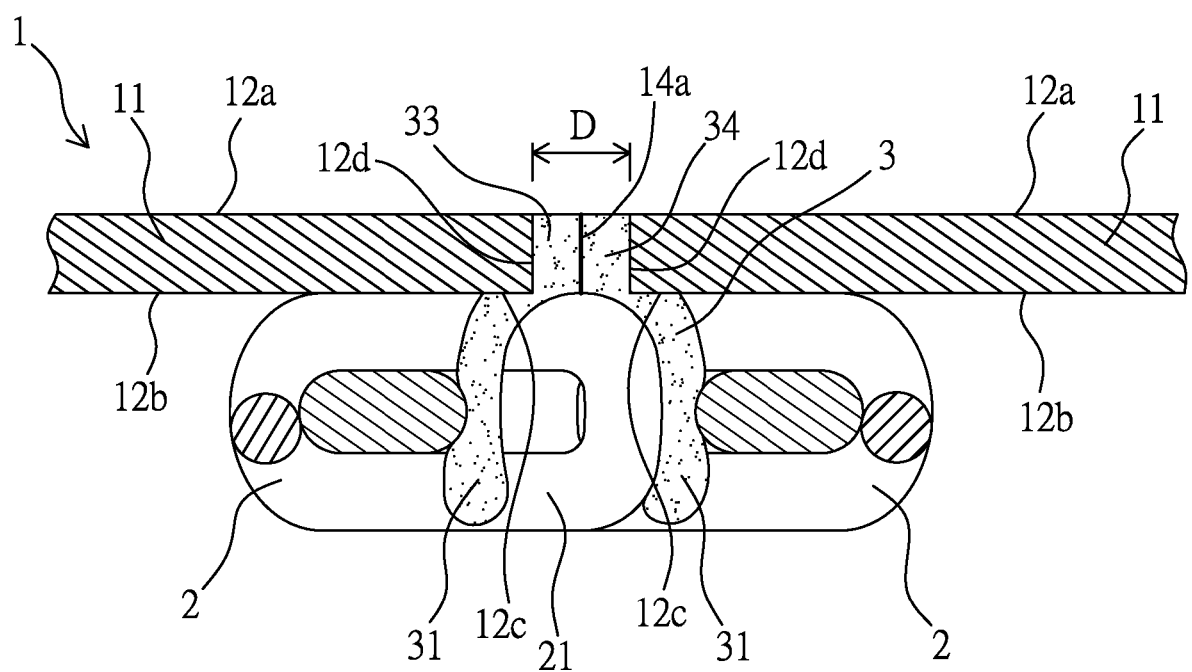

As shown in FIG. 4, the central slit 13 has a width D and a first cutting slit 14a after the slide fastener 1 is coupled. During manufacturing, a height of the left covering member 33 and that of the right covering member 34 can be adjusted according to actual needs, so that the height h of the left cutting end surface 33a and the height h of the right cutting end surface 34a can be aligned, higher or lower than the top surface 12a; according to this embodiment, the left covering member 33 and the right covering member 34 are limited within the central slit 13, and the height h of the left cutting end surface 33a and the height h of the right cutting end surface 34a are substantially aligned with the top surface 12a.

The gap filling member 31 is provided with an anchoring function, and served to adhere each of the inner side edges 12d and each of the bottom inner edges 12c of the pair of support tapes 11, so that each of the inner side edges 12d of the pair of support tapes 11 are able to firmly support the left covering member 33 and the right covering member 34, thereby ensuring the left covering member 33 and the right covering member 34 to be prevented from displacing or falling while being in use.

Figure 5:
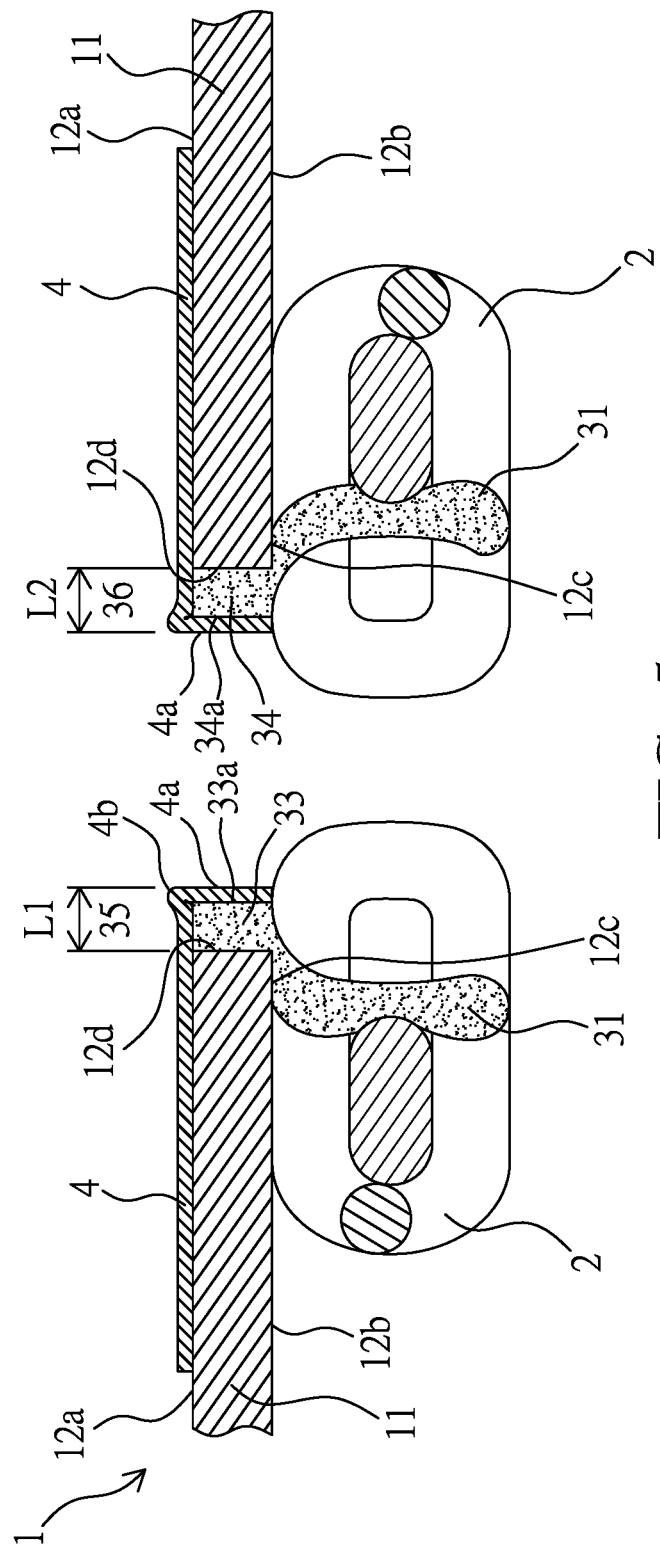

As shown in FIG. 5, when the support tape 11 at the left side and the support tape 11 at the right side are in a separated status, the top surface 12a of the support tape 11 at the left side and the left covering member 33 are transversally adhered with a waterproof layer 4, the top surface 12a of the support tape 11 at the right side and the right covering member 34 are transversally adhered with another waterproof layer 4, and a covering layer 4a extended from each of the waterproof layers 4 is able to longitudinally cover at least one portion of the left cutting end surface 33a of the left covering member 33 and at least one portion of the right cutting end surface 34a of the right covering member 34. As such, a first covering body 35 having a first length L1 is jointly defined by the left covering member 33 and the covering layer 4a, and a second covering body 36 having a second length L2 is jointly defined by the right covering member 34 and the covering layer 4a.

According an alternative of this embodiment, when the pair of support tapes 11 are in a separated status, the waterproof layer 4 is continuously adhered on the top surface 12a of the support tape 11 at the left side, the left covering member 33, the right covering member 34 and the top surface 12a of the support tape 11 at the right side, then a cutting procedure is processed, so that the covering layer 4a of the waterproof layer 4 after being cut is able to cover at least one portion of the left cutting end surface 33a of the left covering member 33, and the covering layer 4a of the another waterproof layer 4 after being cut is able to cover at least one portion of the right cutting end surface 34a of the right covering member 34. Accordingly, the left covering member 33 and the right covering member 34 can be effectively expanded through the thickness of the covering layer 4a, the first covering body 35 having the first length L1 can be jointly defined by the left covering member 33 and the covering layer 4a, and the second covering body 36 having the second length L2 can be jointly defined by the right covering member 34 and the covering layer 4a. Wherein, the covering layer 4a and the waterproof layer 4 have the same or different thicknesses.

According to this embodiment, a length of the covering layer 4a is greater than the height h of the left cutting end surface 33a and the height h of the right cutting end surface 34a, thus the covering layer 4a has a margin to form a folded part 4b higher than the top surface 12a, and the covering layer 4a is able to more precisely close to the plurality of continuous coupling elements 2 through the folded part 4b adjusting locations of the covering layer 4a covering each of the left cutting end surface 33a and the right cutting end surface 34a, thereby further enhancing a fluid-impervious function.

Figure 6:
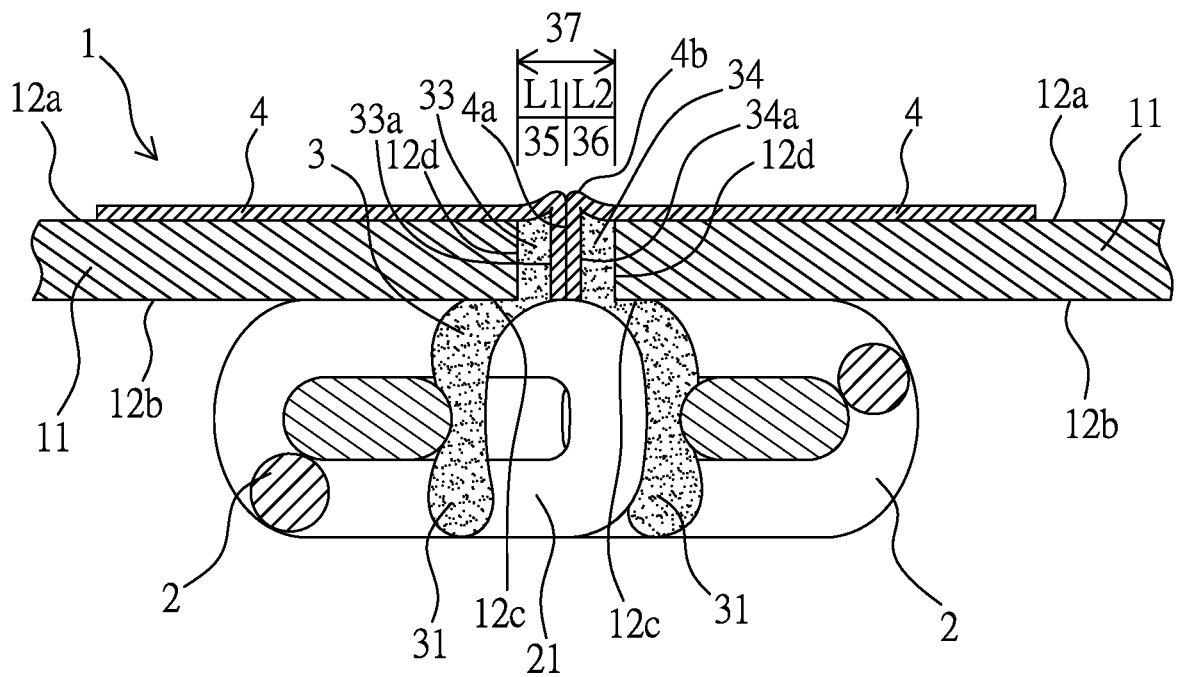

As shown in FIG. 6, when the plurality of continuous coupling elements 2 of the pair of support tapes 11 are in a coupled status, a sum of the first length L1 of the first covering body 35 and the second length L2 of the second covering body 36 is greater than the width D, so that the first covering body 35 and the second covering body 36 are able to elastically abut against each other so as to form a tightening deformation, and a covering abutting member 37 is formed in the central slit 13 and has a fluid-impervious function against a fluid, for example bearing a hydrostatic pressure of 30 gf/cm$^2$.

Figure 7:
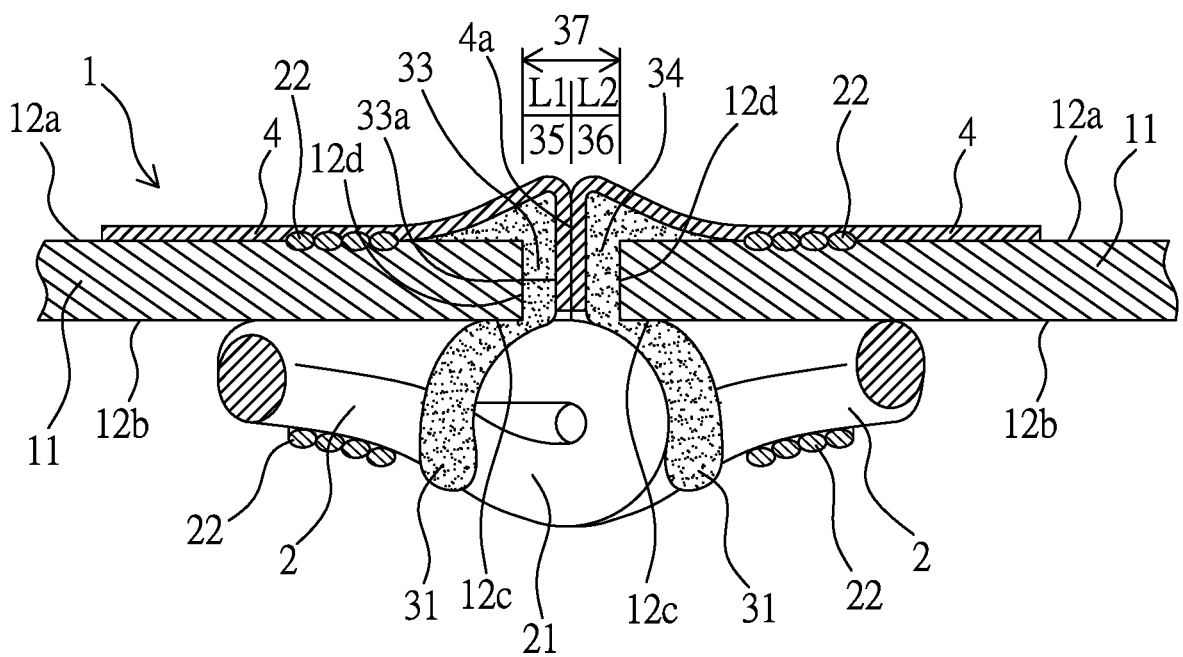
FIG. 7 is a cross sectional view illustrating the assembly of the fluid-impervious slide fastener according to a second embodiment of the present invention.

Please refer to FIG. 7, which discloses a second embodiment of the fluid-impervious slide fastener of the present invention; compared to the first embodiment, a continuous-coil type cord-free coupling element weaving slide fastener 1 is adopted in the second embodiment, the same codes shared by the second embodiment and the first embodiment are defined as the same component, because there are a lot of components shared by the second embodiment and the first embodiment, only differences between the second embodiment and the first embodiment are illustrated as follows.

The differences between the second embodiment and the first embodiment are that: when the slide fastener 1 is in the coupled status, an extruding mold (known as a prior art and not provided with a code) is disposed in the central slit 13 of the pair of support tapes 11, then a high polymer elastomer extruding procedure is processed, for example the molten high polymer elastomer member 3 being filled and fully disposed in the plurality of adjacent gaps 21 of the continuous coupling elements 2, arranged in a two row manner and cable of coupling with each other, through a high polymer elastomer filling port of the extruding mold, thereby forming the gap filling member 31, and the high polymer elastomer member 3 overflows the central slit 13 so as to adhered on one portion of each of the top surfaces 12a of the pair of support tapes 11, thereby forming the arrow-shaped slit covering member 32.

And then, a cutting procedure is processed to the slit covering members 32 so as to form the left covering member 33 and the right covering member 34 having a substantially same length, the left covering member 33 has the left cutting end surface 33a, the right covering member 34 has the right cutting end surface 34a, and the left cutting end surface 33a and the right cutting end surface 34a have a height h, respectively; and the central slit 13 has the width D and the first cutting slit 14a after the slide fastener 1 is coupled (as shown in FIG. 2 and FIG. 4).

In other words, when the pair of support tapes 11 are in the separated status, the top surface 12a of the support tape 11 at the left side and the left covering member 33 are transversally adhered with the waterproof layer 4, the top surface 12a of the support tape 11 at the right side and the right covering member 34 are transversally adhered with the another waterproof layer 4, and the covering layer 4a extended from each of the waterproof layers 4 is able to longitudinally cover at least one portion of the left cutting end surface 33a of the left covering member 33 and longitudinally cover at least one portion of the right cutting end surface 34a of the right covering member 34. As such, the first covering body 35 having the first length L1 is jointly defined by the left covering member 33 and the covering layer 4a, and the second covering body 36 having the second length L2 is jointly defined by the right covering member 34 and the covering layer 4a.

According an alternative of this embodiment, when the pair of support tapes 11 are in the separated status, the waterproof layer 4 is continuously adhered on the top surface 12a of the support tape 11 at the left side, the left covering member 33, the right covering member 34 and the top surface 12a of the support tape 11 at the right side, then a cutting procedure is processed, so that the covering layer 4a of the waterproof layer 4 after being cut is able to cover at least one portion of the left cutting end surface 33a of the left covering member 33, and the covering layer 4a of the another waterproof layer 4 after being cut is able to cover at least one portion of the right cutting end surface 34a of the right covering member 34. Accordingly, the left covering member 33 and the right covering member 34 can be effectively expanded through the thickness of the covering layer 4a, the first covering body 35 having the first length L1 can be jointly defined by the left covering member 33 and the covering layer 4a, and the second covering body 36 having the second length L2 can be jointly defined by the right covering member 34 and the covering layer 4a.

As shown in FIG. 7, when the plurality of continuous coupling elements 2 of the pair of support tapes 11 are in the coupled status, the sum of the first length L1 of the first covering body 35 and the second length L2 of the second covering body 36 is greater than the width D, so that the first covering body 35 and the second covering body 36 are able to elastically abut against each other so as to form a tightening deformation, and the covering abutting member 37 is formed in the central slit 13 and has a fluid-impervious function against a fluid, for example bearing a hydrostatic pressure of at least 30 gf/cm$^2$.

Please refer to FIG. 8, which discloses a third embodiment of the fluid-impervious slide fastener of the present invention, the same codes shared by the third embodiment and the second embodiment are defined as the same component, because there are a lot of components shared by the third embodiment and the second embodiment, only differences between the third embodiment and the second embodiment are illustrated as follows.

The differences between the third embodiment and the second embodiment are that: the fluid-impervious slide fastener is a continuous-coil type cord-free coupling element invisible sewing slide fastener 1, the continuous-coil type cord-free coupling element 2 are respectively disposed on a folded part 12e of each of the top surfaces 12a of the pair of support tapes 11.

When the slide fastener 1 is in the coupled status, an extruding mold (known as a prior art and not provided with a code) is disposed in the central slit 13 of the slide fastener 1, then an extruding procedure is processed, for example the molten high polymer elastomer member 3 being filled and fully disposed in the plurality of adjacent gaps 21 of the continuous coupling elements 2, arranged in a two row manner and cable of coupling with each other, through a high polymer elastomer filling port of the extruding mold, thereby forming the gap filling member 31, wherein the high polymer elastomer member 3 disclosed in the second embodiment can be adopted in the third embodiment, the high polymer elastomer member 3 overflows the central slit 13 so as to adhered on one portion of each of the top surfaces 12a of the pair of support tapes 11, thereby forming the arrow-shaped slit covering member 32.

And then, a cutting procedure is processed to the slit covering members 32 so as to form the left covering member 33 and the right covering member 34 having a substantially same length, the left covering member 33 has the left cutting end surface 33a, the right covering member 34 has the right cutting end surface 34a, and the left cutting end surface 33a and the right cutting end surface 34a have the height h, respectively; and the central slit 13 has the width D and the first cutting slit 14a after the slide fastener 1 is coupled (as shown in FIG. 2 and FIG. 4).

When the pair of support tapes 11 are in the separated status, the top surface 12a of the support tape 11 at the left side and the left covering member 33 are transversally adhered with the waterproof layer 4, the top surface 12a of the support tape 11 at the right side and the right covering member 34 are transversally adhered with the another waterproof layer 4, and the covering layer 4a extended from each of the waterproof layers 4 is able to longitudinally cover at least one portion of the left cutting end surface 33a of the left covering member 33 and longitudinally cover at least one portion of the right cutting end surface 34a of the right covering member 34. As such, the first covering body 35 having the first length L1 is jointly defined by the left covering member 33 and the covering layer 4a, and the second covering body 36 having the second length L2 is jointly defined by the right covering member 34 and the covering layer 4a.

According an alternative of this embodiment, when the pair of support tapes 11 are in the separated status, the waterproof layer 4 is continuously adhered on the top surface 12a of the support tape 11 at the left side, the left covering member 33, the right covering member 34 and the top surface 12a of the support tape 11 at the right side, then a cutting procedure is processed, so that the covering layer 4a of the waterproof layer 4 after being cut is able to cover at least one portion of the left cutting end surface 33a of the left covering member 33, and the covering layer 4a of the another waterproof layer 4 after being cut is able to cover at least one portion of the right cutting end surface 34a of the right covering member 34. Accordingly, the left covering member 33 and the right covering member 34 can be effectively expanded through the thickness of the covering layer 4a, the first covering body 35 having the first length L1 can be jointly defined by the left covering member 33 and the covering layer 4a, and the second covering body 36 having the second length L2 can be jointly defined by the right covering member 34 and the covering layer 4a.

Figure 8:
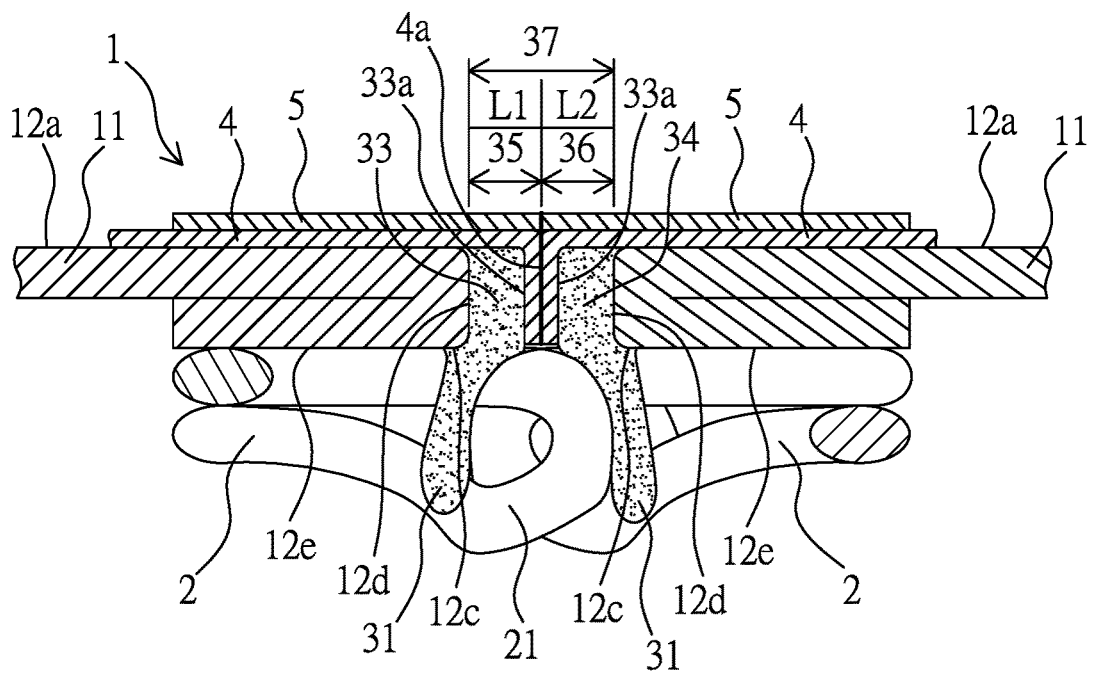
FIG. 8 is a cross sectional view illustrating the assembly of the fluid-impervious slide fastener according to a third embodiment of the present invention.

As shown in FIG. 8, when the plurality of continuous coupling elements 2 of the pair of support tapes 11 are in the coupled status, the sum of the first length L1 of the first covering body 35 and the second length L2 of the second covering body 36 is greater than the width D, so that the first covering body 35 and the second covering body 36 are able to elastically abut against each other so as to form a tightening deformation, and the covering abutting member 37 is formed in the central slit 13 and has a fluid-impervious function against a fluid, for example bearing a hydrostatic pressure of 30 gf/cm$^2$.

Accordingly, with the disclosure provided by the third embodiment, a conventional invisible slide fastener can be provided with a high fluid-impervious function, in other words the central slit 13 of the fluid-impervious invisible slide fastener and the pair of support tapes 11 are both provided with the fluid-impervious function.

As shown in FIG. 8, a light reflecting film 5 is adhered on the waterproof layer of the invisible fluid-impervious slide fastener, a width of the light reflecting film 5 is about 10 mm and symmetrically adhered on a central portion of the fluid-impervious slide fastener, so that the pair of support tapes 11 respectively have the light reflecting film 5 having the width of 5 mm after the cutting procedure. Wherein, the light reflecting film 5 can be replaced by a colorful patterned film for prettifying the appearance and increasing the safety.

Figure 9:
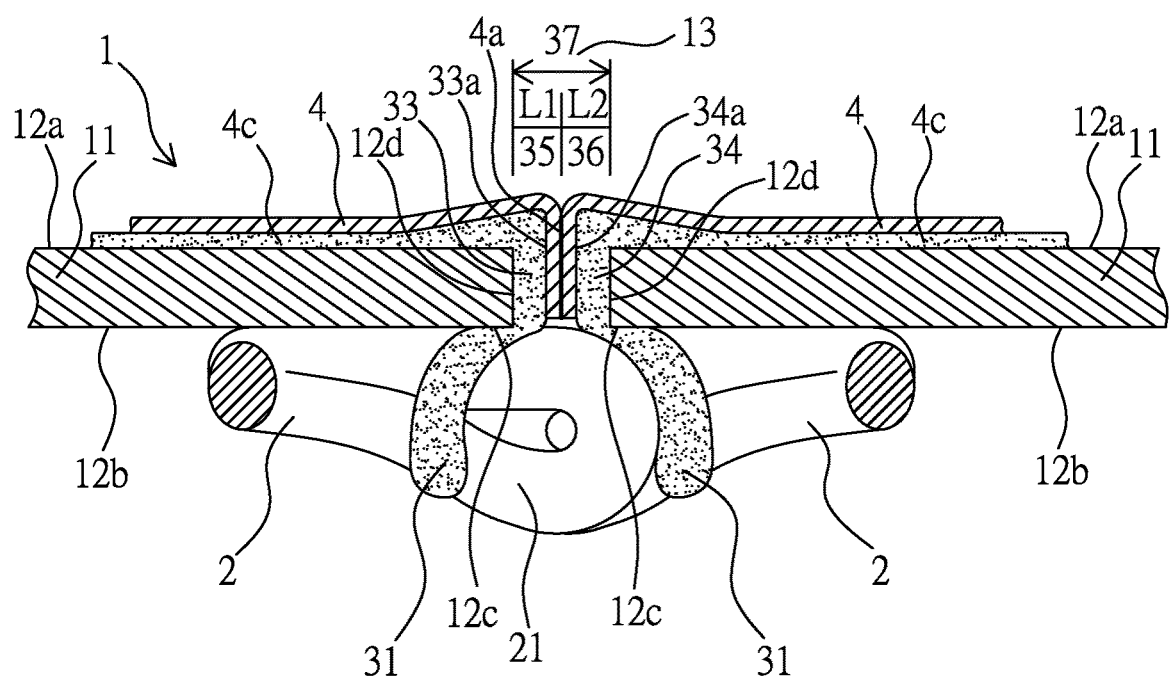
FIG. 9 is a cross sectional view illustrating the assembly of the fluid-impervious slide fastener according to a fourth embodiment of the present invention.

Please refer to FIG. 9, which discloses a fourth embodiment of the fluid-impervious slide fastener of the present invention, compared to the second embodiment, a continuous-coil type cord-free coupling element weaving slide fastener is adopted in the fourth embodiment, the same codes (marks) shared by the fourth embodiment and the third embodiment are defined as the same component, because there are a lot of components shared by the fourth embodiment and the third embodiment, only differences between the fourth embodiment and the third embodiment are illustrated as follows.

The differences between the fourth embodiment and the second embodiment are that: an extruding procedure of the high polymer elastomer member 3 is processed in the central slit 13 and a top surfaces 12a of a pair of support tapes 11, so that the high polymer elastomer member 3 is fully disposed in the plurality of adjacent gaps 21 of the continuous coupling elements 2, arranged in a two row manner and cable of coupling with each other, thereby forming the gap filling member 31, and a slit covering member 32 is transversally formed on the continuous coupling elements 2, the high polymer elastomer member 3 overflows the central slit 13 so as to adhered on a large portion of each of the top surfaces 12a of the pair of support tapes 11, thereby forming slit covering member 32 and a high polymer elastomer layer 4c, and the high polymer elastomer layer 4c is able to increase the adhering strength of the waterproof layer 4 and each of the top surfaces 12a.

And then, a cutting procedure is processed to the slit covering members 32 so as to form the left covering member 33 and the right covering member 34 having a substantially same length, the left covering member 33 has the left cutting end surface 33a, the right covering member 34 has the right cutting end surface 34a, and the left cutting end surface 33a and the right cutting end surface 34a have the height h, respectively; and the central slit 13 has the width D and the first cutting slit 14a after the slide fastener 1 is coupled (as shown in FIG. 2 and FIG. 4).

When the pair of support tapes 11 are in the separated status, at least one portion of the high polymer elastomer layer 4c of the support tape 11 at the left side and the left covering member 33 are transversally adhered with the waterproof layer 4, at least one portion of the high polymer elastomer layer 4c of the support tape 11 at the right side and the right covering member 34 are transversally adhered with the another waterproof layer 4, and the covering layer 4a extended from each of the waterproof layers 4 is able to longitudinally cover at least one portion of the left cutting end surface 33a of the left covering member 33 and longitudinally cover at least one portion of the right cutting end surface 34a of the right covering member 34. As such, the first covering body 35 having the first length L1 is jointly defined by the left covering member 33 and the covering layer 4a, and the second covering body 36 having the second length L2 is jointly defined by the right covering member 34 and the covering layer 4a.

According an alternative of this embodiment, when the pair of support tapes 11 are in the separated status, the waterproof layer 4 is continuously adhered on the high polymer elastomer layer 4c of the pair of support tapes 11, the left covering member 33 and the right covering member 34, then a cutting procedure is processed, so that two sides defined at the central portion of the waterproof layer 4 are respectively formed with the covering layer 4a for respectively covering at least one portion of the left cutting end surface 33a of the left covering member 33 and at least one portion of the right cutting end surface 34a of the right covering member 34. Accordingly, the first covering body 35 having the first length L1 can be jointly defined by the left covering member 33 and the covering layer 4a, and the second covering body 36 having the second length L2 can be jointly defined by the right covering member 34 and the covering layer 4a.

As shown in FIG. 9, when the plurality of continuous coupling elements 2 of the pair of support tapes 11 are in the coupled status, the sum of the first length L1 of the first covering body 35 and the second length L2 of the second covering body 36 is greater than the width D of the central slit 13, so that the first covering body 35 and the second covering body 36 are able to elastically abut against each other so as to form a tightening deformation, and the covering abutting member 37 is formed in the central slit 13 and has a fluid-impervious function against a fluid, for example bearing a hydrostatic pressure of 30 gf/cm².

Figure 10:
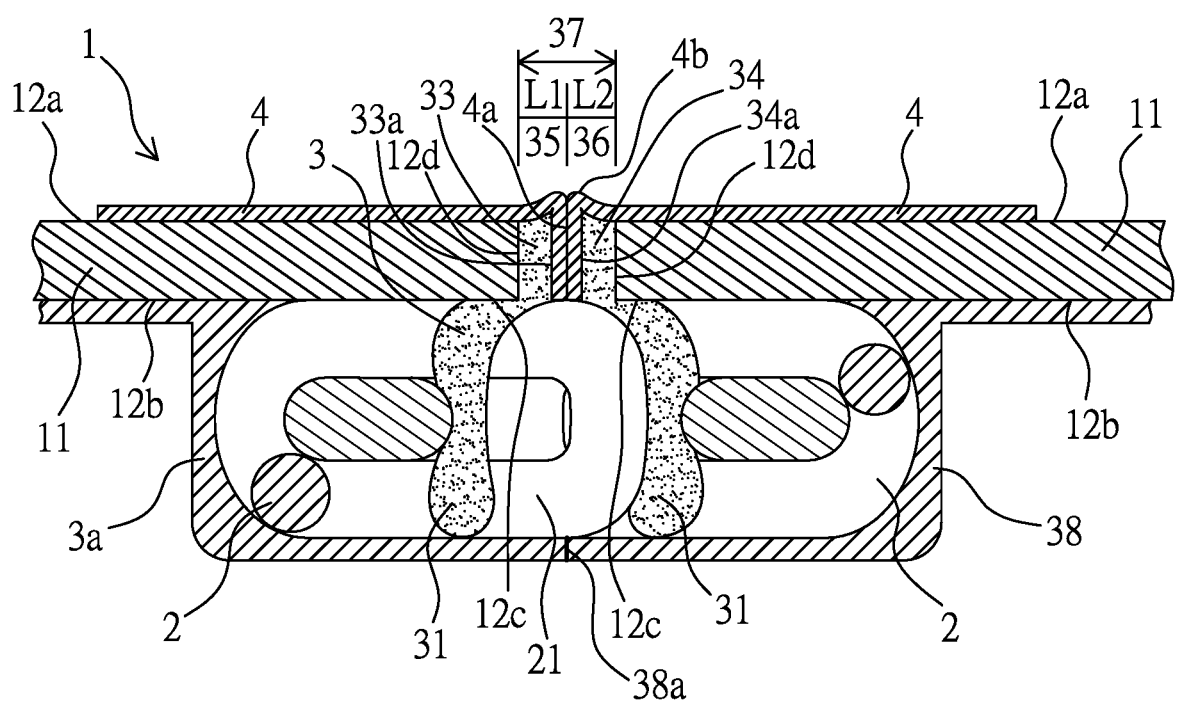
FIG. 10 is a cross sectional view illustrating the assembly of the fluid-impervious slide fastener according to a fifth embodiment of the present invention.

Please refer to FIG. 10, which discloses a fifth embodiment of the fluid-impervious slide fastener of the present invention, compared to the first embodiment, a continuous-coil type coupling element sewing slide fastener 1 having cords is adopted in the fifth embodiment, the same codes (marks) shared by the fifth embodiment and the first embodiment are defined as the same component, because there are a lot of components shared by the fifth embodiment and the first embodiment, only differences between the fifth embodiment and the first embodiment are illustrated as follows.

The differences between the fifth embodiment and the first embodiment are that: when the slide fastener 1 is in a coupled status, an extruding mold (known as a prior art and not provided with a code) is disposed in the central slit 13 of the pair of support tapes 11, then a high polymer elastomer extruding procedure is processed, for example the molten high polymer elastomer member 3 being filled and fully disposed in the plurality of adjacent gaps 21 of the continuous coupling elements 2 through a high polymer elastomer filling port of the extruding mold, thereby forming the gap filling member 31, the slit covering member 32 is formed in the central slit 13 above the continuous coupling elements 2, and the high polymer elastomer member 3 are served to adhere each of the inner side edges 12d and the bottom inner edges 12c. Then, on the bottom surfaces 12b of the pair of support tapes 11, the molten high polymer elastomer member 3 covers the continuous coupling elements 2, an outer surface of the combining yarn 22 and at least one portion of each of the bottom surfaces of the pair of support tapes 11, thereby forming a coupling element covering body 38, and the coupling element covering body 38 and the gap filling member 31 are combined as one piece.

And then, a cutting procedure is processed to the slit covering members 32 so as to form the left covering member 33 and the right covering member 34 having a substantially same length, the left covering member 33 has the left cutting end surface 33a, the right covering member 34 has the right cutting end surface 34a, and the left cutting end surface 33a and the right cutting end surface 34a have a height h, respectively; and the central slit 13 has the width D and the first cutting slit 14a after the slide fastener 1 is coupled (as shown in FIG. 2 and FIG. 4). Moreover, a cutting procedure is processed on the coupling element covering body 38 so as to form a second cutting slit 38a; substantially speaking, a location of the second cutting slit 38a is corresponding to the first cutting slit 14a on another surface.

Lastly, when the pair of support tapes 11 are in the separated status, the at least one portion of the high polymer elastomer layer 4c of the support tape 11 at the left side and the left covering member 33 are transversally adhered with the waterproof layer 4, the at least one portion of the high polymer elastomer layer 4c of the support tape 11 at the right side and the right covering member 34 are transversally adhered with the another waterproof layer 4, and the covering layer 4a extended from each of the waterproof layers 4 is able to longitudinally cover at least one portion of the left cutting end surface 33a of the left covering member 33 and longitudinally cover at least one portion of the right cutting end surface 34a of the right covering member 34.

As such, the first covering body 35 having the first length L1 is jointly defined by the left covering member 33 and the covering layer 4a, and the second covering body 36 having the second length L2 is jointly defined by the right covering member 34 and the covering layer 4a.

According an alternative of this embodiment, when the pair of support tapes 11 are in the separated status, the waterproof layer 4 is continuously adhered on each of the high polymer elastomer layers 4c of the pair of support tapes 11, the left covering member 33 and the right covering member 34, then a cutting procedure is processed, so that two sides defined at the central portion of the waterproof layer 4 are respectively formed with the covering layer 4a for respectively covering at least one portion of the left cutting end surface 33a of the left covering member 33 and at least one portion of the right cutting end surface 34a of the right covering member 34. Accordingly, the first covering body 35 having the first length L1 can be jointly defined by the left covering member 33 and the covering layer 4a, and the second covering body 36 having the second length L2 can be jointly defined by the right covering member 34 and the covering layer 4a.

As shown in FIG. 10, when the plurality of continuous coupling elements 2 of the pair of support tapes 11 are in the coupled status, the sum of the first length L1 of the first covering body 35 and the second length L2 of the second covering body 36 is greater than the width D of the central slit 13, so that the first covering body 35 and the second covering body 36 are able to elastically abut against each other so as to form a tightening deformation, and the covering abutting member 37 is formed in the central slit 13 and has a fluid-impervious function against a fluid, for example bearing a hydrostatic pressure of 30 gf/cm$^2$.

The coupling element covering body 38 is able to prevent the continuous coupling elements 2 oppositely arranged at the left side and the right side from horizontally sliding, and to prevent the continuous coupling elements 2 oppositely arranged at the left side and the right side and each of the associated support tapes from horizontally sliding in a left or a right direction, so that the continuous coupling elements 2 oppositely arranged at the left side and the right side can be kept in a horizontally coupled status. As such, a problem of the central slit being stretched by the above-mentioned external horizontal force can be avoided for increasing the fluid-pervious function of the covering abutting member 37, and the continuous coupling elements 2 oppositely arranged at the left side and the right side are kept in the horizontally couple status for allowing the continuous coupling elements 2 oppositely arranged at the left side and the right side to be stably arranged and coupled within a slider, thereby increasing the durability.

According to the aforesaid embodiments, the covering layer 4a having a proper thickness is adopted for covering the left cutting end surface 33a and the right cutting end surface 34a; the left covering member 33 and the right covering member 34 can be effectively expanded through the thickness of the covering layer 4a, thereby eliminating the first cutting slit 14a which causes a fluid permeating problem, and different levels of waterproof requirement can be satisfied. Wherein, the thickness of the covering layer 4a is between 0.05 mm to 0.70 mm, but what shall be addressed is that the scope of the present invention is not limited to the above-mentioned arrangement. Moreover, the covering layer 4a can respectively cover the left cutting end surface 33a and the right cutting end surface 34a with an adhering means. When necessary, the length of the covering layer 4a can be greater than the height h of the left cutting end surface 33a and the height h of the right cutting end surface 34a, so that the covering layer 4a has the margin to form the folded part 4b higher than the top surface 12a, and the covering layer 4a is able to more precisely close to the plurality of continuous coupling elements 2 through the folded part 4b adjusting the locations of the covering layer 4a covering each of the left cutting end surface 33a and the right cutting end surface 34a.

Wherein, the waterproof layer 4 is adhered to the pair of support tapes 11, the left covering member 33 and the right covering member 34 by utilizing a hot melt glue, a solvent glue, a water-based glue or a moisture curing polyurethane (PUR). The high polymer elastomer member 3 and the waterproof layer 4 are selected from a group consisted of transparent and/or opaque ethers-polyurethane, esters-polyurethane, silicone, polyurethane/silicone copolymer, polyamide, polyolefin, polyvinyl chloride and fluid-impervious woven fabrics.

Wherein, a dimensional difference of the sum of the first length L1 of the first covering body 35 and the second length L2 of the second covering body 36 being greater than the width D of the central slit 13 is at least 0.10 mm, for example the dimensional difference preferably being between 0.10 mm to 1.30 mm, but what shall be addressed is that the dimensional difference is according to actual needs and shall not be a limitation to the scope of the present invention.

Moreover, the pair of support tapes 11, the left covering member 33 and the right covering member 34 can be firstly provided with a adhesive layer then laminated with the waterproof layer 4, the adhesive layer can be selected from a hot melt glue, moisture curing polyurethane (PUR), thermal curing thermal plastic polyurethane (TPU) or a solvent glue; and the waterproof layer can be selected from thermal plastic polyurethane (TPU) or high-melting-point polyurethane, but what shall be addressed is not the scope of the present invention is not limited to the above-mentioned arrangement.

Based on what has been disclosed above, advantages achieved by the present invention are as follows. With the sum of the first covering body having the first length and including the covering layer and the second covering body having the second length and including the covering layer being greater than the width of the central slit, when the plurality of continuous coupling elements are in the coupled status, the first covering body and the second covering body are able to elastically abut against each other so as to form a tightening deformation, and the central slit is still provided with the fluid-impervious function against a fluid, for example gas or liquid, when the central slit is under a high pressure, for example a hydrostatic pressure of at least 30 gf/cm$^2$. Accordingly, the fluid-impervious slide fastener provided by the present invention is novel and more practical in use comparing to prior arts.

Moreover, the fluid-impervious slide fastener is suitable to be applied in garments, for example clothes or pants, a portable item, for example a purse or a backpack, or a camping tool, for example a tent or a sleep bag for enabling the products to be provided with a fluid-impervious function.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A manufacturing method of a fluid-impervious slide fastener, including steps:
    preparing a pair of support tapes, wherein each of said support tapes has a top surface, a bottom surface and an inner side edge, and a bottom inner edge of each of said bottom surfaces is disposed with a plurality of continuous coupling elements arranged in a row manner;
    processing an extruding procedure of a high polymer elastomer member to a central slit between said pair of support tapes while said pair of support tapes being in a coupled status, thereby allowing a gap filling member to be formed in a plurality of adjacent gaps of said continuous coupling elements, wherein said gap filling member is longitudinally extended and adhered to a corresponding said bottom inner edge and a corresponding said inner side edge of said pair of support tapes, and a slit covering member is transversally formed on said plurality of continuous coupling elements;
    processing a cutting procedure to said slit covering member in said central slit for allowing said slit covering member to be formed as a left covering member and a right covering member, wherein said central slit has a width after said continuous coupling elements are coupled; said left covering member has a left cutting end surface, and said right covering member has a right cutting end surface;
    and disposing a waterproof layer on said top surface of said support tape at a left side and said left covering member, and disposing another waterproof layer on said top surface of said support tape at a right side and said right covering member, wherein a covering layer is extended from a lateral side of each of said waterproof layers to longitudinally cover at least one portion of said left cutting end surface and at least one portion of said right cutting end surface, and a first covering body having a first length is jointly defined by said left covering member and said covering layer, and a second covering body having a second length is jointly defined by said right covering member and said covering layer;
    when said plurality of continuous coupling elements are in a coupled status, a sum of said first length and said second length is greater than said width of said central slit, so that said first covering body and said second covering body are able to elastically abut against each other so as to form a tightening deformation, and a covering abutting member having a fluid-impervious function against a fluid is formed in said central slit.

2. The manufacturing method of the fluid-impervious slide fastener as claimed in claim 1, wherein said covering abutting member in said central slit has a fluid-impervious function of bearing a hydrostatic pressure of at least 30 gf/cm$^2$.

3. The manufacturing method of the fluid-impervious slide fastener as claimed in claim 1, wherein each of said covering layers covers said left cutting end surface and said right cutting end surface with an adhering means.

4. The manufacturing method of the fluid-impervious slide fastener as claimed in claim 3, wherein a length of said covering layer is greater than a height of said left cutting end surface or a height of said right cutting end surface, and said covering layer has a margin to form a folded part higher than said top surface.

5. The manufacturing method of the fluid-impervious slide fastener as claimed in claim 1, wherein said waterproof layer is adhered to said pair of support tapes, said left covering member and said right covering member by utilizing a hot melt glue, a solvent glue, a water-based glue or a moisture curing polyurethane (PUR), and said waterproof layer is selected from a group consisted of transparent and/or opaque ethers-polyurethane, esters-polyurethane, silicone, polyurethane/silicone copolymer, polyamide, polyolefin, polyvinyl chloride and fluid-impervious woven fabrics.

6. The manufacturing method of the fluid-impervious slide fastener as claimed in claim 1, wherein a dimensional difference of said sum of said first length and said second length being greater than said width of said central slit is preferably between 0.10 mm to 1.30 mm.

7. The manufacturing method of the fluid-impervious slide fastener as claimed in claim 1, wherein a thickness of said waterproof layer and a thickness of said covering layer are 0.05 mm to 0.70 mm.

8. The manufacturing method of the fluid-impervious slide fastener as claimed in claim 1, wherein said high polymer elastomer member is disposed in said central slit and arranged to be higher than or aligned with each of said top surfaces of said pair of support tapes.

9. The manufacturing method of the fluid-impervious slide fastener as claimed in claim 1, wherein said high polymer elastomer member overflows said central slit so as to adhere to at least one portion defined on each of said top surfaces of said pair of support tapes.

10. The manufacturing method of the fluid-impervious slide fastener as claimed in claim 1, wherein said continuous coupling elements are respectively disposed in each of said bottom inner edges of said pair of support tapes or a folded part of each of said top surfaces.

11. The manufacturing method of the fluid-impervious slide fastener as claimed in claim 1, wherein a high polymer elastomer member is further provided to cover said continuous coupling elements oppositely arranged at a left side and a right side, a combining yarn and at least one portion of each of said bottom surfaces of said pair of support tapes, thereby forming a coupling element covering body, and said coupling element covering body and said gap filling member are combined as one piece.

* * * * *